United States Patent [19]

Pine et al.

[11] Patent Number: 5,248,569
[45] Date of Patent: Sep. 28, 1993

[54] BATTERY DOOR HAVING INTEGRATED LOCKING MECHANISM

[75] Inventors: Jerrold S. Pine; Stefan Peana; Charles A. Hahs, Jr., all of Boca Raton, Fla.

[73] Assignee: Motorola, Inc., Schaumburg, Ill.

[21] Appl. No.: 921,664

[22] Filed: Jul. 30, 1992

[51] Int. Cl.⁵ .......................... H01M 2/10; H01M 2/04
[52] U.S. Cl. ........................ 429/97; 429/100; 455/90
[58] Field of Search .............. 429/96, 97, 99, 100, 429/123; 455/90, 347

[56] References Cited

U.S. PATENT DOCUMENTS

| | | | |
|---|---|---|---|
| 3,693,089 | 9/1972 | Hutchinson et al. | |
| 3,881,961 | 5/1975 | Nation | 429/97 |
| 4,129,688 | 12/1978 | Fischer et al. | 429/97 |
| 4,230,777 | 10/1980 | Gatto | 429/97 |
| 4,371,594 | 2/1983 | Ohara et al. | 429/97 |
| 4,391,883 | 7/1983 | Williamson et al. | 429/97 |
| 4,690,878 | 9/1987 | Nakamura | 429/99 X |
| 4,880,712 | 11/1989 | Gordecki | 429/97 |
| 4,965,141 | 10/1990 | Suzuki | 429/9 |
| 4,972,508 | 11/1990 | King | 455/90 |
| 4,993,973 | 2/1991 | Selinko | 429/96 X |

*Primary Examiner*—Anthony Skapars
*Attorney, Agent, or Firm*—Gardner, Kelly A.; William E. Koch; Thomas G. Berry

[57] ABSTRACT

A housing assembly (100) for enclosing a battery (108) and electrical circuitry (107) comprises a housing element (105) formed to enclose the battery (108) and the electrical circuitry (107) and a battery door (110) for providing access to the battery (108) enclosed by the housing element (105), wherein the battery door (110) comprises mounting means (115) for pivotally mounting the battery door (110) to the housing element (105) such that the battery door (110) rotates between an open and a closed position. The housing assembly (100) further comprises a conductive element (125) mounted to the battery door (110) for engaging the housing element (105) to secure the battery door (110) in the closed position, wherein the conductive element (125) electrically contacts the battery (108) and the electrical circuitry (107) to provide battery power to the electrical circuitry (107) when the battery door (110) is in the closed position.

8 Claims, 2 Drawing Sheets

BATTERY DOOR HAVING INTEGRATED LOCKING MECHANISM

FIELD OF THE INVENTION

This invention relates in general to an improved battery door, and more specifically to a battery door having an integrated locking mechanism.

BACKGROUND OF THE INVENTION

Battery doors are typically used to provide access to batteries which power electronic devices. In small personal electronic devices, e.g., selective call receivers, a battery door may be opened to allow access to a battery which is situated within the housing of the selective call receiver. The battery may thereafter be removed and replaced when necessary.

The typically small size of selective call receivers commonly results in battery doors which slide open to permit access to the battery. This type of conventional battery door often includes conductive elements, such as electrical contacts, for transferring the power stored in the battery to one or more electronic circuits contained within the housing of the selective call receiver. When the battery door is in a closed position, the electrical contacts typically couple the electronic circuits to the battery, thereby conveniently providing for the flow of power from the battery. This type of door, however, must often be detachable to permit full accessibility to the battery. As a result, the battery door is frequently misplaced or lost. Furthermore, the sliding motion used to engage and disengage the battery door often results in wear to the electrical contacts due to the friction produced between the battery and the electrical contacts. After frequent replacement of the battery, therefore, the electrical contacts could become worn to such a degree that they provide insufficient or only sporadic electrical coupling between the electronic circuits and the battery.

An alternative to this type of sliding battery door is a hinged battery door that rotates between the open position, wherein the battery is accessible, and the closed position, wherein the electrical contacts couple the battery to the electronic circuits contained within the housing of the selective call receiver. Although wear on the electrical contacts is avoided through use of a hinged battery door, this type of battery door typically includes a transverse or rotating locking member to ensure that the battery door remains closed during normal operation of the selective call receiver. The locking member is commonly designed as an additional part that is moveably mounted to the battery door. Therefore, the locking member must be ordered, stocked, and assembled separately from other parts included in the selective call receiver, resulting in possible manufacturing problems, such as loss of the locking member or improper assembly of the locking member.

Thus, what is needed is a battery door having an integrated locking mechanism. Additionally, the operation of the battery door should prevent wear on electrical contacts due to friction.

SUMMARY OF THE INVENTION

A housing assembly for enclosing a battery and electrical circuitry comprises a housing element formed to enclose the battery and the electrical circuitry and a battery door for providing access to the battery enclosed by the housing element, wherein the battery door comprises mounting means for pivotally mounting the battery door to the housing element such that the battery door rotates between an open and a closed position. The housing assembly further comprises a conductive element mounted to the battery door for engaging the housing element to secure the battery door in the closed position, wherein the conductive element electrically contacts the battery and the electrical circuitry to provide battery power to the electrical circuitry when the battery door is in the closed position.

DESCRIPTION OF A PREFERRED EMBODIMENT

Figure 1:
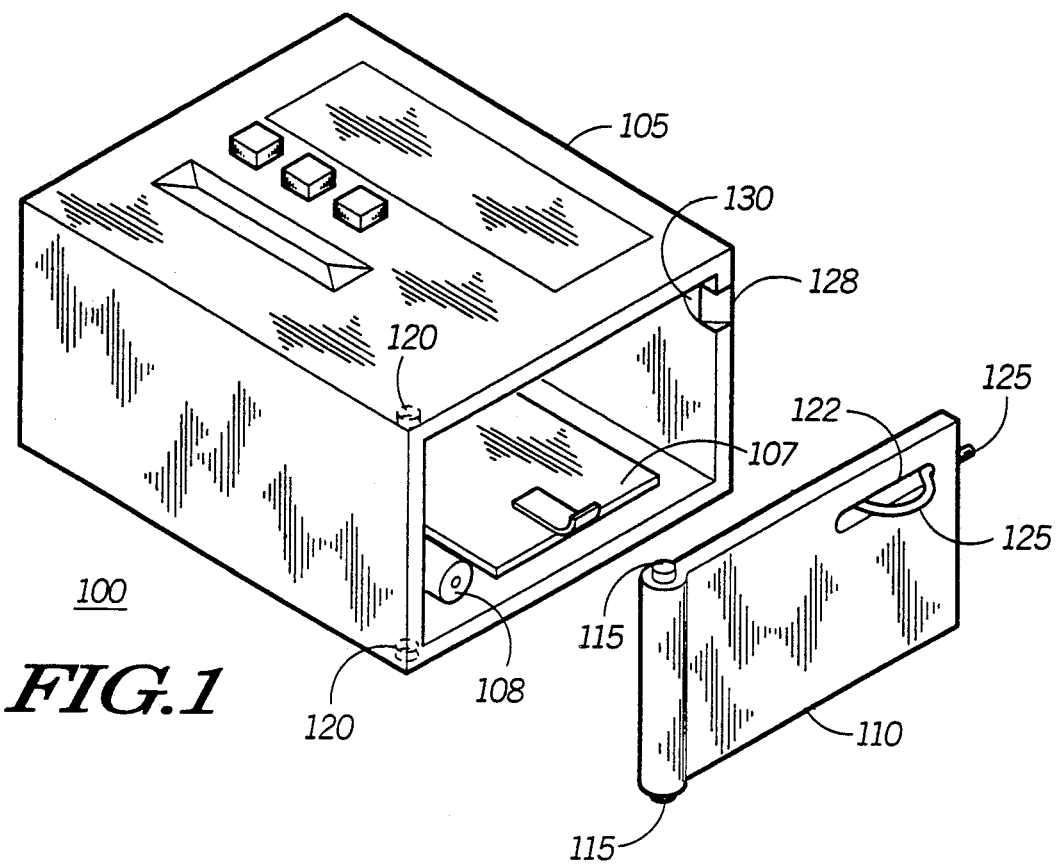
FIG. 1 is an exploded view of a disassembled electronic device having a housing and a battery door in accordance with a preferred embodiment of the present invention.

FIG. 1 depicts an exploded view of a disassembled electronic device 100, such as a selective call receiver, in accordance with a preferred embodiment of the present invention. The electronic device 100 preferably comprises a housing 105, wherein an electronic circuit 107 and a battery 108 are situated, and a battery door 110 for providing access to the battery 108. The battery door 110 includes two extrusions 115, which are inserted into mounting cavities 120 formed into the housing 105, thereby hingeably mounting the battery door 110 to the housing 105. A slot 122 is further formed into the battery door 110 such that a portion of a conductive element, i.e., an electrical contact 125, which is coupled to the battery door 110, extends through the slot 122.

Figure 2:
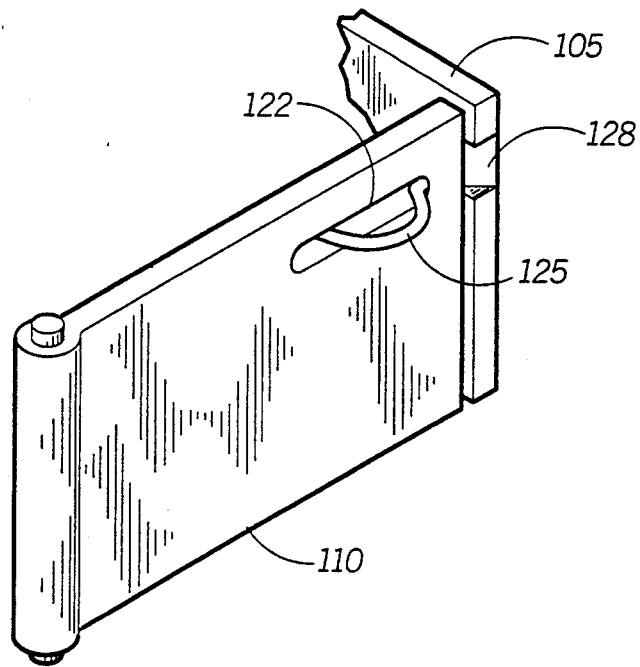
FIG. 2 is an illustration of the battery door of FIG. 1 in a closed position in accordance with the preferred embodiment of the present invention.

When mounted to the housing 105, the battery door 110 may be pivotally rotated between an open position, in which the battery 108 may be accessed, and a closed position, as shown in FIG. 2. According to the present invention, when the battery door 110 is rotated into the closed position, the electrical contact 125 encounters a ramped surface 128 formed into the housing 105. As the battery door 110 continues to be rotated into the closed position, the electrical contact 125, which is preferably formed from a resilient material, forcibly slides along the ramped surface 128, causing the displacement of the electrical contact 125 within the slot 122.

Figure 3:
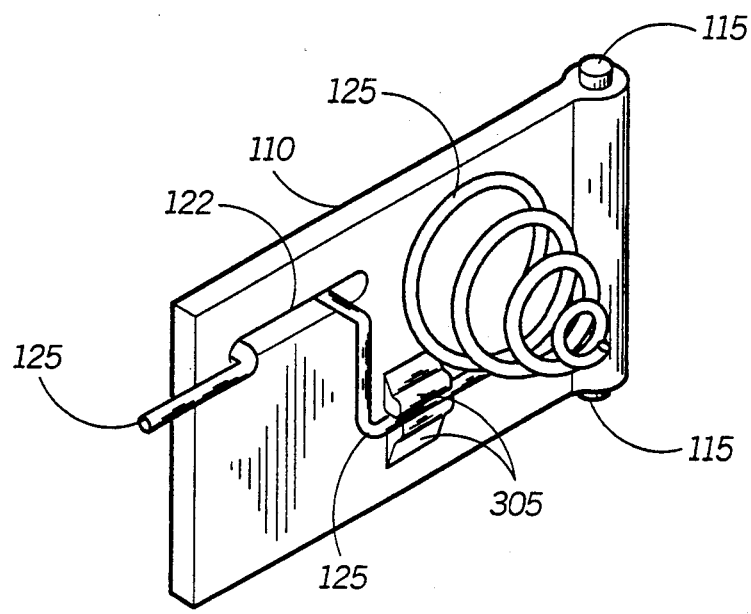
FIG. 3 is an isometric view of the inside of the battery door of FIG. 1 coupled to an electrical contact in accordance with the preferred embodiment of the present invention.

Returning to FIG. 1, when the battery door 110 is completely closed, the electrical contact 125, formed, as described above, from a resilient material, springs back into place, thus engaging a locking cavity 130 formed into the housing 105. The engagement of the locking cavity 130 thereby secures the battery door 110 in the closed position. Preferably, the battery door 110 may be thereafter rotated into the open position when the electrical contact 125 is forcibly displaced within the slot 122 such that it disengages the locking cavity 130. Such displacement of the electrical contact 125 results when force is exerted against the portion of the electrical contact 125 extending through the slot 122. Referring next to FIG. 3, an isometric view of the inside of the battery door 110 is depicted. In accordance with the preferred embodiment of the present invention, the electrical contact 125, which is employed to engage the locking cavity 130 (FIG. 1), is mounted to the battery door 110 by a clasp 305 formed into the battery door 110. In this manner, unlike conventional battery doors, an existing element, i.e., the electrical contact 125, is used to lock the battery door 110 in the closed position. Therefore, this integrated locking mechanism eliminates many of the problems, such as stocking and assembly, associated with the use of additional parts.

Figure 4:
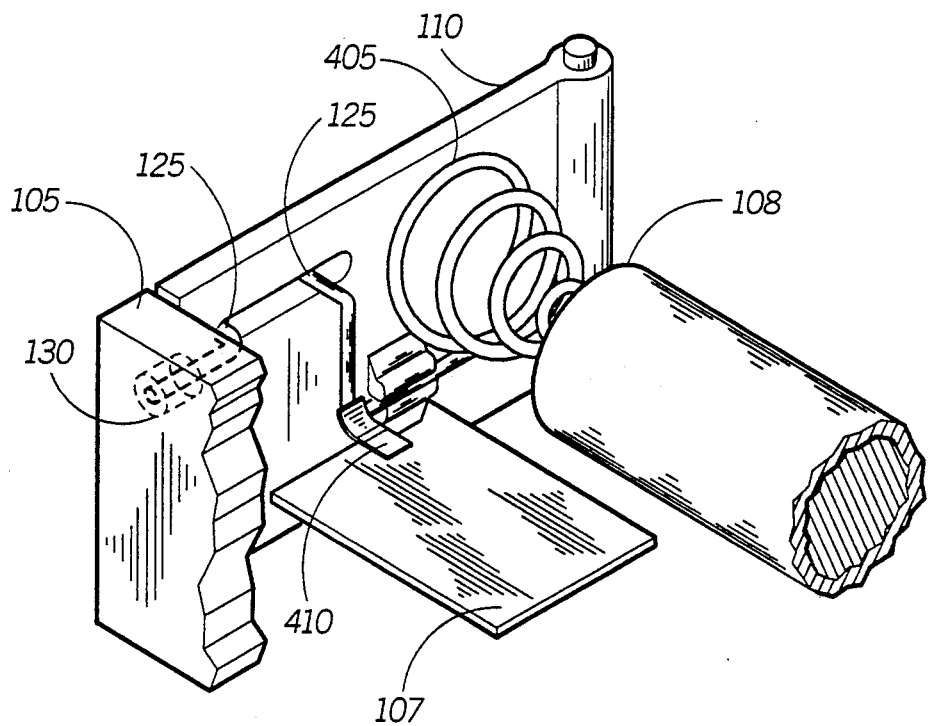
FIG. 4 is an illustration depicting the employment of the electrical contact to transfer power from a battery to an electronic circuit in accordance with the preferred embodiment of the present invention.

With reference to FIG. 4, the electrical contact 125 transfers power from the battery 108 to the electronic circuit 107 when the electrical contact 125 engages the locking cavity 130, i.e., when the battery door 110 is secured in the closed position. In accordance with the preferred embodiment of the present invention, a coiled end 405 of the electrical contact 125 is forced into contact with the battery 108 when the battery door 110 is closed. At the same time, the electrical contact 125 electrically couples to the electronic circuit 107, preferably by means of a conductive element 410 mounted to the electronic circuit 107. In this manner, the battery 108 is able to power the electronic circuit 107 without the use of circuitry additional to that provided by the battery door 110. Also, because the battery door 110 is opened and closed with a pivotal, rather than sliding, movement, the electrical contact 125 mounted to the battery door 110 is not worn as a result of repeatedly accessing the battery 108. Therefore, sufficient electrical coupling between the battery 108 and the electronic circuit 107 is ensured.

Although, in accordance with the preferred embodiment of the present invention, the electrical contact 125 is described as coupling the battery 108 to one electronic circuit 107, it may be appreciated that any number of electronic circuits could be powered, via the electrical contact 125, by the battery 108. Furthermore, the electrical contact 125 could, in alternate embodiments of the present invention, be employed to couple electrically equivalent areas, e.g., ground planes, of several electronic circuits to each other, rather than to a battery.

In summary, a hinged battery door having an integrated locking mechanism, in accordance with the preferred embodiment of the present invention, eliminates some of the problems associated with the use of conventional battery doors. As described above, the pivotal operation of the battery door provides for repeated use of the battery door, such as during replacement of the battery, without the wear on an electrical contact which would occur during use of a conventional sliding battery door. Furthermore, the hinged battery door remains mounted to the housing when in an open position, thus preventing the loss of the battery door.

A further feature of the present invention is the employment of the existing electrical contact as a locking mechanism. Therefore, unlike conventional hinged battery doors, additional parts for locking the battery door into a closed position are not necessary. As a result, possible manufacturing problems, such as those created during stocking and assembling an additional part, are avoided.

By now, it may be appreciated that there has been provided a battery door having an integrated locking mechanism, the operation of which does not cause wear on an electrical contact mounted to the battery door.

We claim:

1. A housing assembly for enclosing a battery and electrical circuitry, comprising:
   a housing element formed to enclose the battery and the electrical circuitry;
   a battery door for providing access to the battery enclosed by the housing element, wherein the battery door comprises mounting means for pivotally mounting the battery door to the housing element such that the battery door rotates between an open and a closed position; and
   a conductive element mounted to the battery door for engaging the housing element to secure the battery door in the closed position, wherein the conductive element electrically contacts the battery and the electrical circuitry to provide battery power to the electrical circuitry when the battery door is in the closed position.

2. The housing assembly in accordance with the claim 1, wherein:
   the battery door has a slot formed therein; and
   a portion of the conductive element extends through the slot in the battery door such that, when the battery door is secured in the closed position by the conductive element, the portion of the conductive element is manipulated to disengage the conductive element from the housing element, thereby unlocking the battery door from the closed position.

3. The housing assembly in accordance with claim 1, wherein:
   the housing element has mounting cavities formed therein; and
   the mounting means includes mounting extrusions formed into the battery door, wherein the mounting extrusions are inserted into the mounting cavities formed into the housing element to hingeably mount the battery door to the housing element.

4. An electronic device, comprising:
   electronic circuitry capable of being powered by a battery;
   a housing for enclosing the electronic circuitry and the battery;
   a battery door for providing access to the battery, the battery door comprising mounting means for pivotally mounting the battery door to the housing such that the battery door rotates between an open and a closed position; and
   a conductive element mounted to the battery door for engaging the housing to secure the battery door in the closed position, wherein the conductive element contacts the battery and the electronic circuitry when the battery door is in the closed position, thereby electrically coupling the battery to the electronic circuitry.

5. The electronic device in accordance with claim 4, wherein:
   the battery door has a slot formed therein; and
   a portion of the conductive element extends through the slot in the battery door such that, when the battery door is secured in the closed position by the conductive element, the portion of the conductive element is manipulated to disengage the conductive element from the housing, thereby unlocking the battery door from the closed position.

6. The electronic device in accordance with claim 4, wherein:

the housing has mounting cavities formed therein; and the mounting means includes mounting extrusions formed into the battery door, wherein the mounting extrusions are inserted into the mounting cavities formed into the housing to hingeably mount the battery door to the housing.

7. A selective call receiver, comprising:

receiver means for receiving a message, and capable of being powered by a battery;

a housing for enclosing the receiver means and the battery;

a battery door for providing access to the battery, the battery door comprises mounting means for pivotally mounting the battery door to the housing such that the battery door rotates between an open and a closed position; and the battery door has a slot formed therein; and a conductive element is mounted to the battery door for engaging the housing to secure the battery door in the closed position, wherein:

the conductive element further contacts the battery and the receiver means, thereby electrically coupling the battery to the receiver means; and a portion of the conductive element extends through the slot in the battery door such that, when the battery door is secured in the closed position by the conductive element, the portion of the conductive element is manipulated to disengage the conductive element from the housing, thereby unlocking the battery door from the closed position.

8. The selective call receiver in accordance with claim 7, wherein:

the housing has mounting cavities formed therein; and the mounting means includes mounting extrusions formed into the battery door wherein the mounting extrusions are inserted into the mounting cavities formed into the housing to hingeably mount the battery door to the housing.

* * * * *

UNITED STATES PATENT AND TRADEMARK OFFICE
CERTIFICATE OF CORRECTION

PATENT NO. : 5,248,569

DATED : September 28, 1993

INVENTOR(S) : Pine et al.

It is certified that error appears in the above-indentified patent and that said Letters Patent is hereby corrected as shown below:

Column 5, line 17 after "battery" delete "." and insert --, wherein:--

Signed and Sealed this

Twelfth Day of July, 1994

Attest:

BRUCE LEHMAN

Attesting Officer

Commissioner of Patents and Trademarks